United States Patent
Dai et al.

(10) Patent No.: US 12,200,277 B2
(45) Date of Patent: *Jan. 14, 2025

(54) MULTIPLE PROTOCOL PREDICTION AND IN-SESSION ADAPTATION IN VIDEO STREAMING

(71) Applicant: HULU, LLC, Santa Monica, CA (US)

(72) Inventors: Tongyu Dai, Beijing (CN); Lan Xie, Beijing (CN); Wenhao Zhang, Beijing (CN); Deliang Fu, Beijing (CN); Chao Li, Beijing (CN); Qiang She, Beijing (CN); Yuting Gui, Beijing (CN); Yicheng Liu, Beijing (CN); Yanping Zhou, Beijing (CN); Xizhi Xu, Beijing (CN)

(73) Assignee: HULU, LLC, Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/402,648

(22) Filed: Jan. 2, 2024

(65) Prior Publication Data
US 2024/0137585 A1    Apr. 25, 2024

Related U.S. Application Data

(63) Continuation of application No. 17/116,711, filed on Dec. 9, 2020, now Pat. No. 11,902,599.

(51) Int. Cl.
*H04N 21/2343*    (2011.01)

(52) U.S. Cl.
CPC .............................. *H04N 21/2343* (2013.01)

(58) Field of Classification Search
CPC ............. H04N 21/2343; H04N 21/631; H04N 21/643; H04L 67/02; H04L 65/752;
(Continued)

(56) References Cited

U.S. PATENT DOCUMENTS

| 8,125,901 B2 | 2/2012 | Appleby et al. |
| 8,443,099 B2 | 5/2013 | Baldwin |

(Continued)

FOREIGN PATENT DOCUMENTS

| EP | 212130694 | 12/2021 |
| EP | 4013060 A1 | 6/2022 |

(Continued)

OTHER PUBLICATIONS

European Application Serial No. 21213069.4. Search Report mailed May 13, 2022, 11 pgs.

(Continued)

*Primary Examiner* — Adil Ocak
(74) *Attorney, Agent, or Firm* — Kwan & Olynick LLP

(57) ABSTRACT

In some embodiments, a method sends a set of first requests for a set of first segments of a video in a playback session. A first protocol from a plurality of protocols is specified in at least one of the set of first requests. The set of first segments is received. The method determines whether to switch from using the first protocol to a second protocol in the playback session based on receiving the set of first segments. When switching to the second protocol, the method sends a second request in the playback session, wherein the second request indicates the second protocol is to be used to send a second segment of the video.

20 Claims, 9 Drawing Sheets

(58) Field of Classification Search
CPC ....... H04L 65/612; H04L 65/80; H04L 67/14; H04L 69/08
USPC .......................................................... 725/86
See application file for complete search history.

(56) References Cited

U.S. PATENT DOCUMENTS

| | | | |
|---|---|---|---|
| 9,047,225 | B1 | 6/2015 | Evans |
| 11,019,374 | B2 | 5/2021 | Wallendael et al. |
| 2003/0231586 | A1 | 12/2003 | Chheda |
| 2007/0022442 | A1 | 1/2007 | Gil et al. |
| 2008/0288611 | A1 | 11/2008 | Toyomura et al. |
| 2013/0290492 | A1 | 10/2013 | ElArabawy et al. |
| 2014/0201382 | A1 | 7/2014 | Shivadas et al. |
| 2014/0280781 | A1 | 9/2014 | Gregotski |
| 2014/0330887 | A1 | 11/2014 | Gilberton et al. |
| 2015/0036740 | A1 | 2/2015 | Yang et al. |
| 2015/0180924 | A1 | 6/2015 | O'Callaghan |
| 2016/0044080 | A1 | 2/2016 | duBreuil |
| 2016/0134677 | A1 | 5/2016 | Mueller et al. |
| 2016/0295216 | A1 | 10/2016 | Aaron et al. |
| 2017/0019446 | A1 | 1/2017 | Son et al. |
| 2017/0353516 | A1 | 12/2017 | Gordon |
| 2018/0063549 | A1 | 3/2018 | Amer et al. |
| 2018/0242015 | A1 | 8/2018 | Katsavounidis |
| 2019/0327510 | A1 | 10/2019 | Kalagi et al. |
| 2020/0186580 | A1 | 6/2020 | Thomas et al. |
| 2022/0182685 | A1 | 6/2022 | Dai et al. |

FOREIGN PATENT DOCUMENTS

| | | |
|---|---|---|
| IN | 202144053201 | 12/2021 |
| JP | 2000509592 A | 7/2000 |
| JP | 2007006438 A | 1/2007 |
| JP | 2015507857 A | 3/2015 |
| JP | 2015106358 A | 6/2015 |
| JP | 2017517922 A | 6/2017 |
| JP | 2021196166 A | 12/2021 |
| JP | 7309825 B2 | 7/2023 |
| KR | 1020080031434 A | 4/2008 |
| KR | 1020210174259 | 12/2021 |
| MX | a2021015148 | 12/2021 |
| MX | 2021015148 | 7/2022 |
| WO | 2013079598 A1 | 6/2013 |
| WO | 2015157362 A1 | 10/2015 |

OTHER PUBLICATIONS

Indian Application Serial No. 202144053201, Office Action mailed Jun. 21, 2022, 7 pgs.
Japanese Office Action, Application No. 2021-196166, dated Feb. 7, 2023, English Translation, 5 pages.
KR Office Action, Notice of Grounds for Rejection, KR Application No. 10-2021-0174259, issued May 29, 2023, English translation, 7 pages.

MULTIPLE PROTOCOL PREDICTION AND IN-SESSION ADAPTATION IN VIDEO STREAMING

CROSS REFERENCE TO RELATED APPLICATIONS

This application is a continuation application and, pursuant to 35 U.S.C. § 120, is entitled to and claims the benefit of earlier filed application U.S. patent application Ser. No. 17/116,711, filed Dec. 9, 2020, entitled "MULTIPLE PROTOCOL PREDICTION AND IN-SESSION ADAPTATION IN VIDEO STREAMING", the content of which is incorporated herein by reference in its entirety for all purposes.

BACKGROUND

A protocol, such as hypertext transfer protocol (HTTP), may be used to transfer data between a server and a client. For example, the HTTP protocol family may include the protocols of HTTP 1.1, HTTP 2.0, and HTTP 3.0, which may be used to transfer video data. Each protocol may perform differently when transferring data through the same network conditions. Accordingly, some protocols may perform better in one scenario and some protocols may perform better in another scenario. For instance, HTTP 3.0 may have a higher resistance to packet loss and higher throughput on a network that is longer and has a higher bandwidth. Also, HTTP 1.0 and HTTP 2.0 may perform better on different content delivery networks. Different client devices may experience different network conditions in different playback sessions and also in the same playback session. However, client devices are typically statically configured to use the protocols.

BRIEF DESCRIPTION OF THE DRAWINGS

With respect to the discussion to follow and to the drawings, it is stressed that the particulars shown represent examples for purposes of illustrative discussion, and are presented to provide a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

Described herein are techniques for a video streaming system. In the following description, for purposes of explanation, numerous examples and specific details are set forth to provide a thorough understanding of some embodiments. Some embodiments as defined by the claims may include some or all the features in these examples alone or in combination with other features described below and may further include modifications and equivalents of the features and concepts described herein.

A system improves the playback process by using different protocols for sending data, such as video, to a client device. The system may predict a protocol to use for a playback session, or a ranking of protocols as will be discussed below. The prediction may predict which protocol out of multiple protocols may perform optimally compared to the other protocols. The prediction may be made before the playback session starts. Then, during the playback session, the system may determine whether another protocol may perform better than the current protocol being used in the playback session.

By dynamically predicting which protocol may be optimal before the playback session, the system is not restricted to using the same protocol for a client device. Conventionally, even if a system is configured to select one out of multiple protocols, the system may be configured to select the protocol using rules, such as a rule that selects the highest protocol that is supported by the client device (e.g., HTTP 3.0). This type of selection is not a prediction of which protocol may perform optimally in the current playback session. Also, by allowing switching between protocols during playback, the system can discover a protocol that may perform better based on characteristics of the playback session. A client device may thus experience better playback conditions by using an optimal protocol that is predicted before the playback session starts or an optimal protocol that is discovered during playback. The process may also be performed per client device as different client devices experience different network conditions.

System Overview

Figure 1:
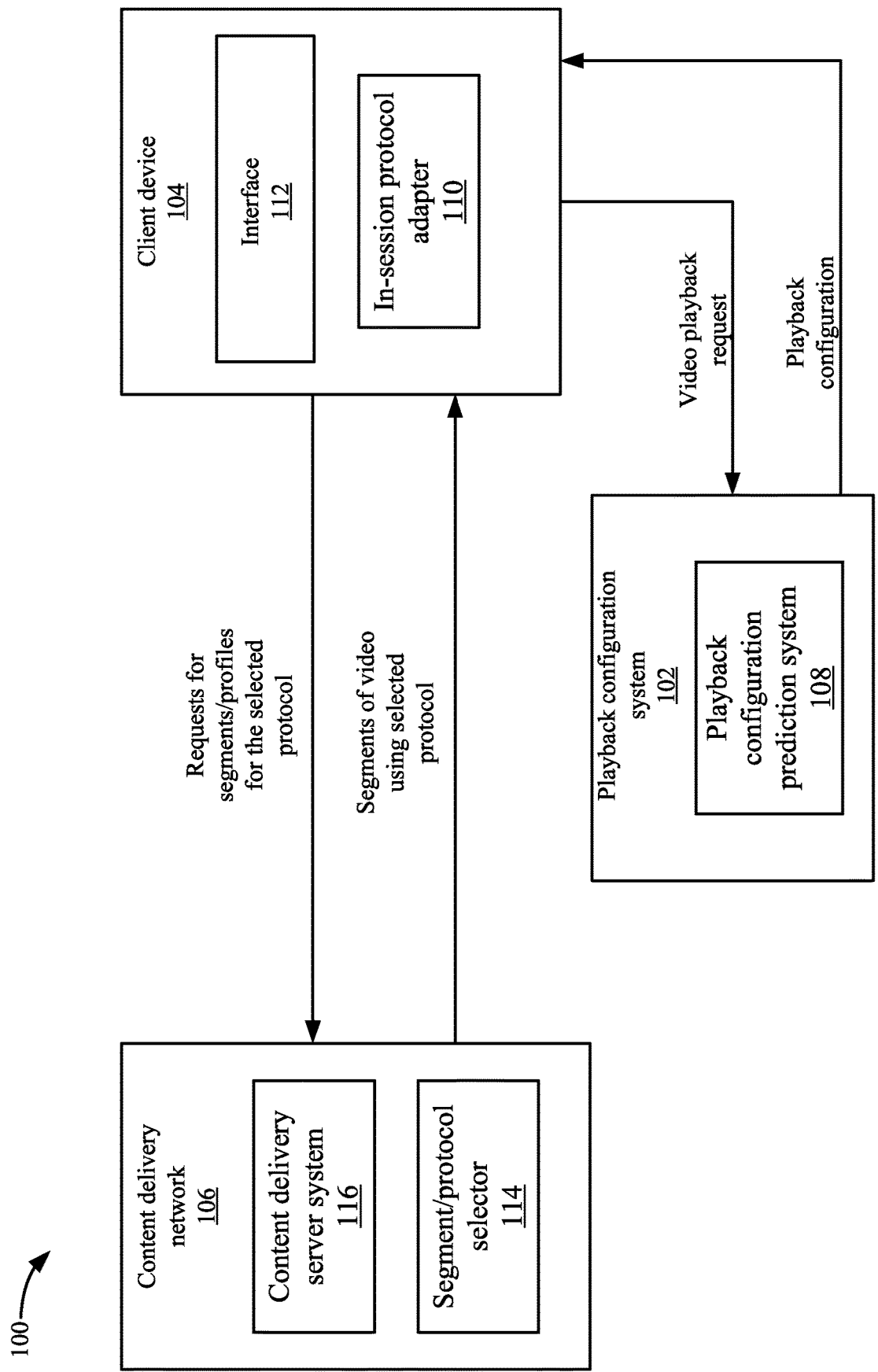
FIG. 1 depicts a simplified system for selecting a protocol for a playback session according to some embodiments.

FIG. 1 depicts a simplified system 100 for selecting a protocol for a playback session according to some embodiments. System 100 includes a playback configuration system 102, a client device 104, and a content delivery network 106. Entities in system 100 may be implemented using one or more computing devices and functions described may be distributed across computing devices. In some examples, functions described with one entity may be distributed to another entity. For example, functions performed by playback configuration system 102 may be performed by content delivery network 106 or client device 104, functions described as being performed by client device 104 may be performed by playback configuration system 102 and/or content delivery network 106, and so on.

Client device 104 may be a computing device that can play back a video, such as a smartphone, a living room device, a tablet device, a personal computer, a set top box, a television, etc. Client device 104 may include an interface 112, which may display a media player to play back a video. Interface 112 may also display other data, such as an interface for browsing videos to play back.

Content delivery network 106 may include one or more servers that can deliver, such as stream, data (e.g., video, audio, or other data) to client device 104. For example, content delivery network 106 includes a content delivery server system 116 that may include one or more servers configured to deliver video to client device 104. In some embodiments, content delivery server system 116 delivers segments of video to client 104. The segments may be a portion of the video, such as six seconds of the video. As is known, a video may be encoded in multiple profiles that correspond to different levels in a profile ladder. The different levels may be different bitrates and/or quality. The profile ladder includes the profiles that are available to client device 104 in the playback session. The profiles may be classified at different levels and each level may be associated with a different characteristic. For example, each level may be associated with a different bitrate, such as 400 kilobits per second (Kbps), 650 Kbps, 1000 Kbps, 1500 Kbps, . . . , and 12000 Kbps. However, a level may be associated with a characteristic other than bitrate, such as a quality characteristic (e.g., resolution). In some embodiments, the level may be determined based on how the video is encoded for the level, such as the video is encoded at the 400 Kbps level (and a resolution) for a profile associated with 400 Kbps (and a resolution). Client device 104 may request a segment of video from one of the profile levels based on current playback conditions. For example, client device 104 may use an adaptive bitrate algorithm to select the profile for the video based on the current available bandwidth and other network conditions.

Playback configuration system 102 may determine a playback configuration for client device 104. For example, when client device 104 selects a video, playback configuration system 102 receives the video playback request. Then, a playback configuration prediction system 108 determines settings for the playback configuration for client device 104. The playback configuration may include information that client device 104 uses to download and play the video. One of the settings of the playback configuration may include information for the protocol to use during the playback session. A protocol may define how video is streamed in a session. Different protocols may operate differently and have different protocol specifications. The HTTP protocol family may include the protocols of HTTP 1.1, HTTP 2.0, and HTTP 3.0, but other protocols may be used. The HTTP protocols may be ranked by version, such as HTTP 1.0 comes before HTTP 2.0, HTTP 2.0 comes before HTTP 3.0, etc. There may also be other HTTP versions developed or protocols other than HTTP. As will be discussed in more detail, playback configuration prediction system 108 may predict the protocol to use for the playback session. The prediction may select a single protocol or rank multiple protocols. The prediction may be performed before the playback session starts upon receiving the request for the video playback.

Client device 104 uses the playback configuration to send requests for segments and certain profiles. In the process, client device 104 may receive a manifest that lists the segments and profiles that are available from a content delivery network 106. Client device 104 may select a profile for a segment and send the request for the segment and the profile. In some embodiments, client device 104 is provided with information for a protocol from the prediction, such as via the playback configuration. Alternatively, playback configuration system 102 may send the prediction to content delivery network 106, which then may send the prediction to client device 104 or just select the protocol. The information for the prediction may be provided in different forms. For example, the information may list a selected protocol for the playback session. Also, the information may list a ranking of protocols that could be used, such as a ranking of HTTP 2.0, HTTP 3.0, and HTTP 1.1.

Client device 104 may request segments of the video in different ways. For example, client device 104 may send a request for a segment. In the request, client device 104 may insert information for the predicted protocol. In some embodiments, client device 104 may insert the information in a header of the request, or in other areas of the request. Also, client device 104 may specify a single protocol to use or may specify a list of protocols, such as the ranking of protocols. Content delivery network 106 may respond to the request with a segment at the requested profile. Content delivery network 106 may select the protocol to use based on the single protocol that is included in the request. Also, content delivery network 106 may or may not support all the protocols. In either case, content delivery network 106 may select the highest ranked protocol that is supported.

A segment/protocol selector 114 in content delivery network 106 receives the request and can select a segment for the requested profile. Also, segment/protocol selector 114 selects the protocol, such as selecting the specified protocol or the highest ranked protocol that is supported. Content delivery network 106 then sends the segments of video using the selected protocol.

In some embodiments, playback configuration prediction system 108 predicts the protocol before the playback session starts using information from the playback session or information from historical playback sessions. The prediction predicts which protocol out of multiple protocols may offer the optimal performance during the playback session.

Once the playback session starts, the characteristics of the playback session may be used to select another protocol that may be determined to provide better performance during the playback session. An in-session protocol adapter 110 may analyze the characteristics of the playback session and determine whether another protocol may provide better performance during the playback session. Although in-session protocol adapter 110 is shown as being included in client device 104, in-session protocol adapter 110 may be in other locations, such as in content delivery network 106 or playback configuration system 102. In-session protocol adapter 110 can switch to a protocol based on current playback conditions instead of using the protocol that was predicted before the session starts. This may offer better playback performance when the conditions of the playback session change, which may be different from the characteristics that are used in the prediction before the playback session starts.

Playback Configuration Prediction System

Figure 2:
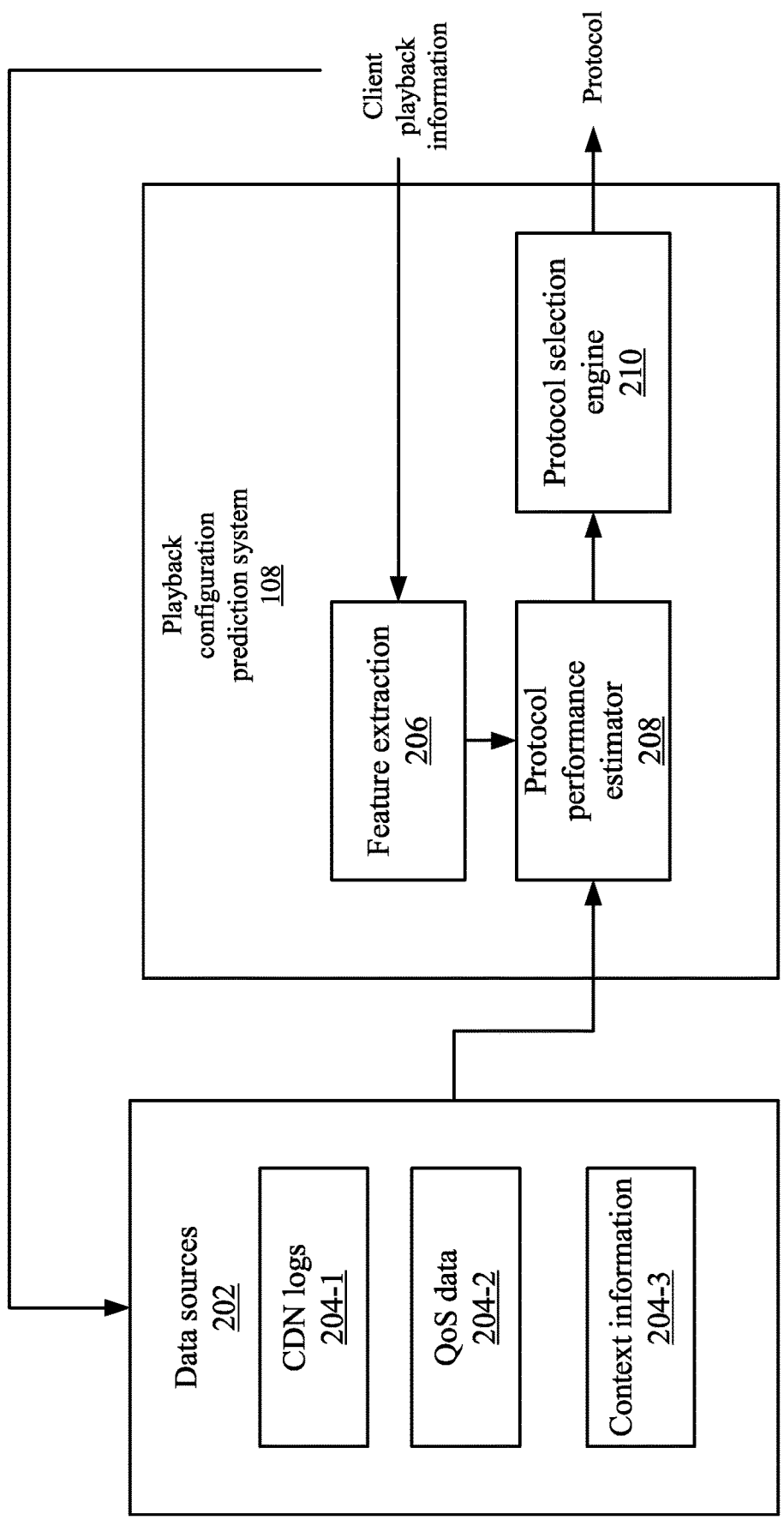
FIG. 2 depicts a more detailed example of a playback configuration prediction system according to some embodiments.

FIG. 2 depicts a more detailed example of playback configuration prediction system 108 according to some embodiments. Playback configuration system 108 may receive information from data sources 202 and also client playback information about client device 104.

Data sources 202 may include content delivery network (CDN) logs 204-1, quality of service (QoS) data 204-2, and context information 204-3. Although this type of information is described, other information that describe characteristics of playback may be used. CDN logs 204-1 may include information from content delivery network 106 and/or other content delivery networks 106 that have streamed videos to client devices 104 (this may include this client device 104 or other client devices 104). The CDN logs describe information for the sessions in which videos were streamed. The CDN logs may be used to analyze the performance of different protocols on the different content delivery networks 106 because the protocol implementations of different content delivery networks 106 may not be the same.

QoS data 204-2 includes information related to the quality of the playback during the playback sessions, which also may be from client device 104, other client devices, or content delivery network 106. Context information 204-3 may include information related to the playback session, such as information about characteristics of client device 104, the network, a time, etc.

Table 1 describes some examples of data sources 202, but other information may be used.

TABLE I

| Category | Information | Description |
| --- | --- | --- |
| CDN logs | Protocol | The protocol used in the playback session. |
| | Hit ratio | The ratio of successful requests to unsuccessful requests in the content delivery network. |
| | Request processing time | The time from a server receiving the request to returning the response. |
| | Throughput | The throughput of sending data of a CDN server. |
| | RTT (round trip time) | The round-trip time from a CDN server to the client device. |
| QoS data | Rebuffer ratio | The ratio of rebuffer time and playback time. A rebuffer is when playback is interrupted to wait for more video to be buffered. |
| | Failure ratio | The ratio of playback failure. Playback failure may be when a segment fails to be downloaded correctly. |
| | Average bitrate | The average bitrate of the playback video segments. |
| Context | Device model | The client device platform, e.g., operating system, living room, mobile phone, etc. |
| | Network mode | The type of current network of the client device, e.g., WiFi, 4G, etc. |
| | Day of week | Day of a week, e.g., Monday, Tuesday, etc. |
| | Hour of day | Hour of a day, e.g., 10:00, 20:00, 21:00, etc. |

Client playback information may be received from client device 104 in real-time and/or may be historical data. Also, client playback information may be integrated into data sources 202 from previous playback sessions. Examples of client playback information may include QoS data 204-2 and context information 204-3. For example, client playback information may include the rebuffer ratio, the failure ratio, and the average bitrate. Client playback information may also be used to perform the prediction of the protocol before the session starts. This client playback information may be received in real-time from client device 104.

Data sources 202 are used to train a model used by a protocol performance estimator 208. The model may be trained to predict a performance. For example, using the historical session information, protocol selection engine 210 may use the features to construct a cluster of user accounts. For each cluster, protocol selection engine 210 may train the parameters of a model. For each upcoming session, protocol performance estimator 208 may estimate the performance for different protocols in each cluster based on the historical session information. The parameters can be also updated by real-time playback session information. Also, data sources 202 may be used to train a model used by a protocol selection engine 210 to select a protocol.

Protocol performance estimator 208 may estimate the performance of the current playback session when using different protocols. This estimation is for an upcoming session referred to as the current playback session. Protocol performance estimator 208 may calculate the performance estimation before the current playback session starts playback of a video. Also, protocol performance estimator 208 may perform the estimation at other times, such as during the current playback session.

Protocol performance estimator 208 may use historical information and/or the current playback session to predict the performance. In some embodiments, feature extraction 206 may extract features from historical playback sessions for client device 104. Feature extraction 206 may then extract features for the current playback session. In some embodiments, feature extraction 206 may cluster sessions that may include similar properties. For example, one cluster may be based on playback using a network #1, a geographic location #1, and other information. Another cluster may be using a network #2 and a geographic location #2. Although clustering is described, clustering may not be used. However, clustering may select sessions that may be similar to the current playback session, which may generate a more relevant prediction because the historical information for the cluster may be more relevant to characteristics of the current playback session.

Protocol performance estimator 208 may estimate a performance for each protocol for the current playback session. In some examples, protocol performance estimator 208 may estimate the performance of a protocol to use for the current playback session based on a playback metric, such as download bandwidth. For example, protocol performance estimator 208 may estimate the average of the playback metric, such as the average download bandwidth. However, it may be hard to accurately estimate the performance for protocols that have less data when using an average metric. For example, when a protocol has not been selected very much compared to another protocol, the average metric may not accurately predict the performance for the protocols. When the variance of performance distribution is large, the average value of a small number of samples may not represent the performance of a protocol, which may cause the wrong protocol to be selected as the optimal protocol. For instance, if a protocol may experience a large range of download bandwidths, a small sample size may not represent a distribution across the entire range. This may make the average download bandwidth for that protocol inaccurate.

In some embodiments, protocol performance estimator 208 may estimate performance that may compensate for protocols that have been selected less than other protocols, such as protocols that may have a smaller sample size than other protocols. In some embodiments, the following function may be used to estimate the performance:

$$P_i = a_i \bar{x}_i + b_i \sqrt{\frac{2 \ln N}{n_i}} + c_i,$$

where $P_i$ is the estimated performance for protocol i, $\bar{x}_i$ is the average performance of the historical playback sessions using protocol i, N is the total count in the cluster of the playback sessions, and $n_i$ is the number of times protocol i has been selected in this cluster. The variables $a_i$, $b_i$ and $c_i$ are weighting factors, which represent a preference for the average performance, sampling bias, and initial selection respectively. The weighting factors may or may not be used. The above function may allow protocols that have been selected less also to have a chance to be selected for the current playback session, which may increase their sample size and make subsequent estimations more accurate.

The following example explains how the above function works. The average throughput of a protocol X is 5 megabytes per second (Mbps) and the average throughput for protocol Y is 4 Mbps. Protocol X has been selected 4500 times and protocol Y has been selected 500 times. If the weighting factors are $a_i=1$, $b_i=10$ and $c_i=0$, the estimated performance for these two protocols can be calculated. For example, the estimated performance for protocol X is:

$$P_x = 5 + 10 * \sqrt{\frac{2*\ln(4500+500)}{4500}} = 5.615.$$

The estimated performance for protocol Y is:

$$P_y = 4 + 10 * \sqrt{\frac{2*\ln(4500+500)}{500}} = 5.486 > P_x$$

Therefore, protocol performance estimator 208 concludes that protocol Y may perform better than protocol X because the estimated performance of 5.846 is greater than 5.615. Protocol performance estimator 208 estimates the performance of protocol Y is higher than protocol X even though the average bandwidth of protocol X is higher. In this way, protocol performance estimator 208 takes into account the confidence of statistical data of historical sessions. As the number of sessions increases, the statistical results may become gradually stable, and the effect of the second part of the function $$\left(\text{e.g.,}\ \sqrt{\frac{2\ln N}{n_i}}\right)$$

will gradually weaken. Thus, the second part may allow protocols that have less sampling to be selected. Accordingly, the protocol Y, which has been selected 500 times, may be selected over protocol X, which has been selected 4500 times even though protocol X has a higher average bandwidth. Selecting protocol Y may eventually increase the accuracy of the historical information for that protocol by adding more samples to the size. Then, the increase in the accuracy of the historical information may increase the accuracy of the performance estimation.

Figure 3:
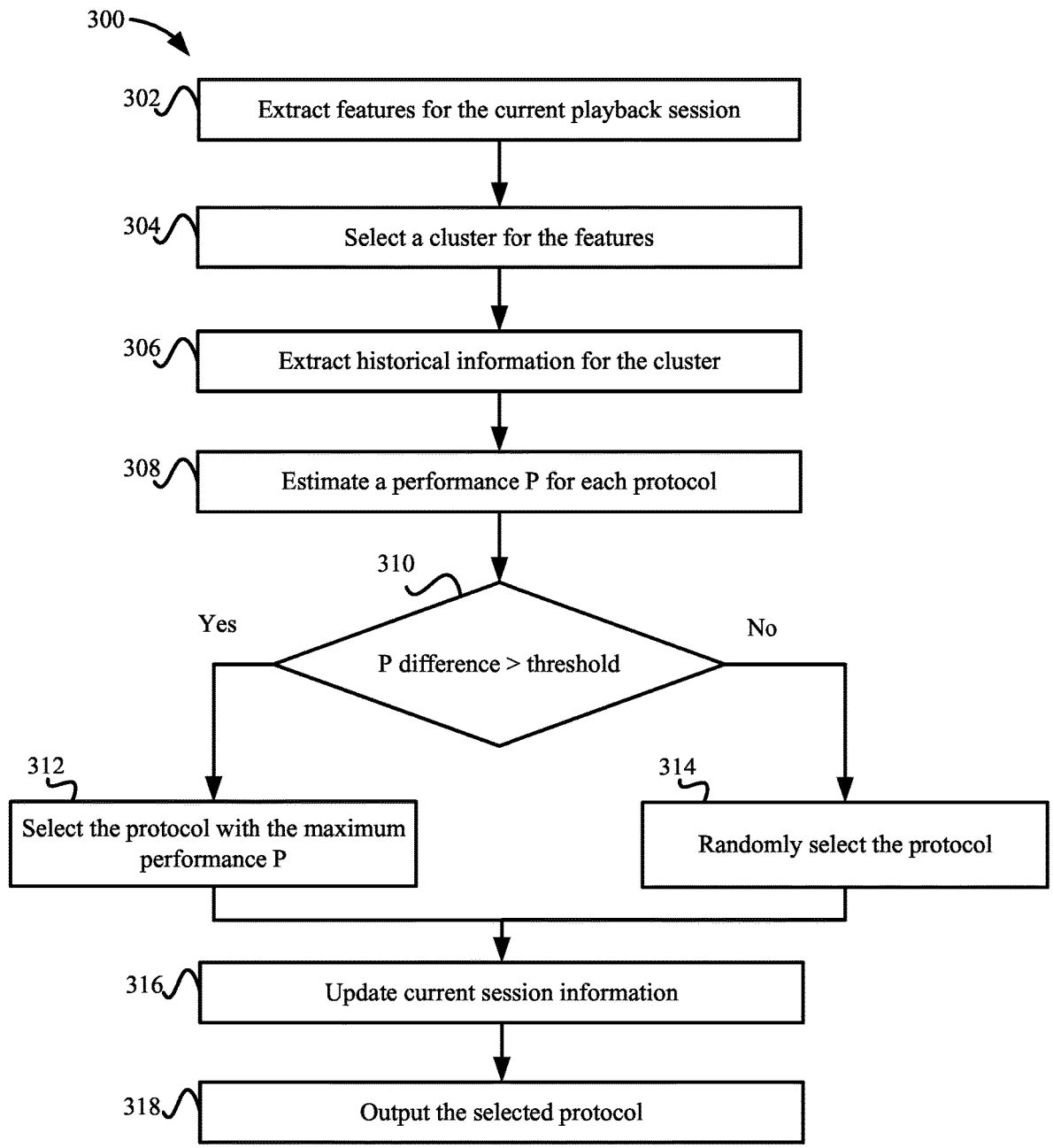
FIG. 3 depicts an example of estimating the performance and selecting a protocol according to some embodiments.

Protocol selection engine 210 receives the performance estimations from protocol performance estimator 208, and selects a protocol. Protocol selection engine 210 may use different methods to select the protocol. FIG. 3 depicts an example of estimating the performance and selecting a protocol according to some embodiments. At 302, protocol performance estimator 208 extracts features for the current playback session. The features may be based on client device 104 or a user account that has requested the video.

At 304, protocol performance estimator 208 selects a cluster for the features. The cluster may include historical playback sessions that include similar features to the current playback session. Also, the cluster may include randomly selected historical playback sessions, or a cluster may include only randomly selected historical playback sessions.

At 306, protocol performance estimator 208 extracts historical information for the cluster. The historical information that is extracted may be based on information needed by the model that is being used to predict the protocol performance. At 308, protocol performance estimator 208 estimates a performance P for each protocol.

At 310, protocol selection engine 210 determines a difference between the estimated performance for the protocols and determines if the performance difference meets a threshold, such as the difference is greater than a threshold. The estimated difference may be based on a comparison of the performances of all protocols. For example, if three protocols are being used, the performance difference may be based on a difference between protocol #1 and protocol #2, protocol #1 and protocol #3, and protocol #2 and protocol #3. Protocol selection engine 210 may determine the largest performance difference. Then, protocol selection engine 210 may use the largest difference in the comparison because if there is a difference between using the protocols for the performance, then selecting a protocol that offers the optimal performance may improve the playback of the video during the current playback session. However, if the difference in the performance for the protocols is small, then selecting one of the protocols will not offer a significant performance improvement over another protocol during the current playback session.

At 312, if the performance difference is greater than the threshold, then protocol selection engine 210 selects a protocol with the maximum performance or selects a ranking of the protocols. The selected protocol or the ranking is used to select the protocol that may provide the best performance during the current playback session.

At 314, if the performance is not greater than the threshold, protocol selection engine 210 may randomly select the protocol. Although random selection is described, other methods may be used. For example, protocol selection engine 210 may select a protocol that has been used less than another protocol. The random selection or selecting a protocol that has been used less may allow playback configuration prediction system 108 to use protocols that have not been used as much as other protocols. This may distribute the use of protocols, which will allow more historical information for protocols to be used.

At 316, protocol selection engine 210 updates the current playback session information, such as updating the ranking of the protocols based on the above. For example, if protocol selection engine 210 selects the protocol with the maximum performance, protocol selection engine 210 may use a ranking of the protocols based on the estimated performance. If protocol selection engine 210 randomly selected the protocols, protocol selection engine 210 may use a random order for the ranking, may include protocols after the randomly selected protocol in order of performance, or use other methods. Then, at 318, protocol selection engine 210 outputs the selected protocol. Protocol selection engine 210 may also output the ranking of protocols if that is being used. The selected protocol may then be used during the current playback session.

Although the above method for selecting the protocol is used, other methods may be used. For example, protocol selection engine 210 may select the protocol using a probability based method. In some examples, there are two protocols X and Y, and their performance predictions are $P_x$ and $P_y$. Protocol selection engine 210 may select protocol X with the probability of $$\frac{P_x}{P_x + P_y} * 100\%,$$

while selecting protocol Y with the probability of $$\frac{P_Y}{P_x + P_y} * 100\%.$$

In this way, the protocol with better performance will have more chances to be selected.

In-Session Protocol Switch

During playback of the video, network conditions may change. For example, the available network bandwidth may change during the current playback session and may be different from what is reflected in historical data. When this occurs, the protocol that was selected before the playback session started may not be the optimal protocol for the current playback conditions. Accordingly, in-session protocol adapter 110 may continue to analyze the performance of the protocols and dynamically switch protocols during the playback session.

In some embodiments, in-session protocol adapter 110 may use different methods to determine if a protocol switch should be performed. For example, in-session protocol adapter 110 may use processes that are referred to as an active detection-based protocol switch and a passive triggered-based protocol switch. The active detection-based protocol switch may actively determine whether switching protocols may improve playback when certain conditions, such as the playback conditions are considered normal, are being experienced. In this case, in-session protocol adapter 110 is actively searching for a better protocol to use. The passive triggered-based protocol switch may switch protocols when other conditions are being experienced, such as the playback experience is considered abnormal. The abnormal conditions may result due to download failures or when available bandwidth is low. In this case, the protocol switch may be automatically triggered because of network conditions. Using the two methods, in-session protocol adapter 110 may use different conditions to determine when switching protocols may result in better playback performance.

Figure 4:
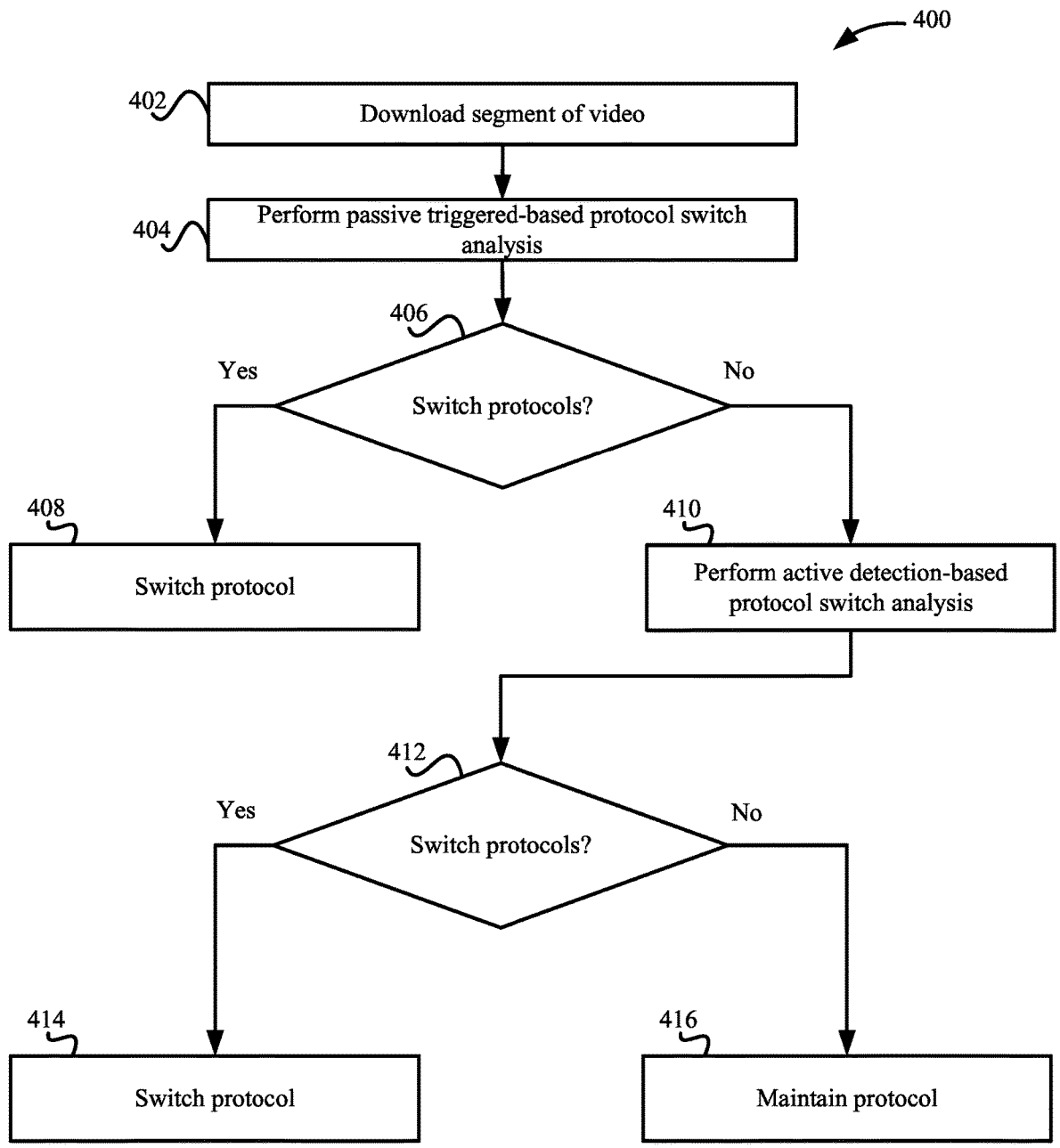
FIG. 4 depicts a simplified flowchart of a method for determining whether to switch protocols according to some embodiments.

FIG. 4 depicts a simplified flowchart 400 of a method for determining whether to switch protocols according to some embodiments. At 402, client device 104 downloads a segment of video. Although a segment of video is described, multiple segments of video may be downloaded and used in the analysis.

At 404, in-session protocol adapter 110 performs a passive triggered-based protocol switch analysis, which will be described in more detail below. At 406, in-session protocol adapter 110 determines whether to switch protocols. If the analysis indicates protocols should be switched, at 408, in-session protocol adapter 110 switches protocols. For example, in-session protocol adapter 110 may automatically switch to a protocol that is predicted to perform better during the current playback session. Also, in-session protocol adapter 110 may switch to another protocol using other methods, such as the next highest protocol in a protocol family or a protocol ranking (e.g., HTTP 2.0 if HTTP 3.0 is being used), a random selection, etc. If in-session protocol adapter 110 determines not to switch protocols, at 410, in-session protocol adapter 110 performs an active detection-based protocol switch analysis. Although the active detection-based protocol switch analysis is described as being performed after the passive triggered-based protocol switch analysis, the processes may be reversed and do not need to be performed in order. However, the passive triggered-based protocol switch analysis may be performed automatically to detect when network conditions deteriorate and may be important to detect before network conditions cause playback problems. The active detection-based protocol switch analysis may be performed at different times or at certain intervals to detect when a protocol may perform better and the urgency to perform a switch of protocols may be less important because network conditions may be considered normal compared to when network conditions are deteriorating, which would increase the urgency to switch protocols.

At 412, in-session protocol adapter 110 determines whether to switch protocols. If the analysis indicates a protocol should be switched, at 414, in-session protocol adapter 110 switches protocols. If not, at 416, in-session protocol adapter 110 maintains the protocol currently being used in the current playback session.

In the passive triggered-based protocol switch, different characteristics of the current playback session may be analyzed. For example, real-time performance characteristics such as the failure of downloading a segment and the available bandwidth may be analyzed to determine whether to switch protocols.

Figure 5:
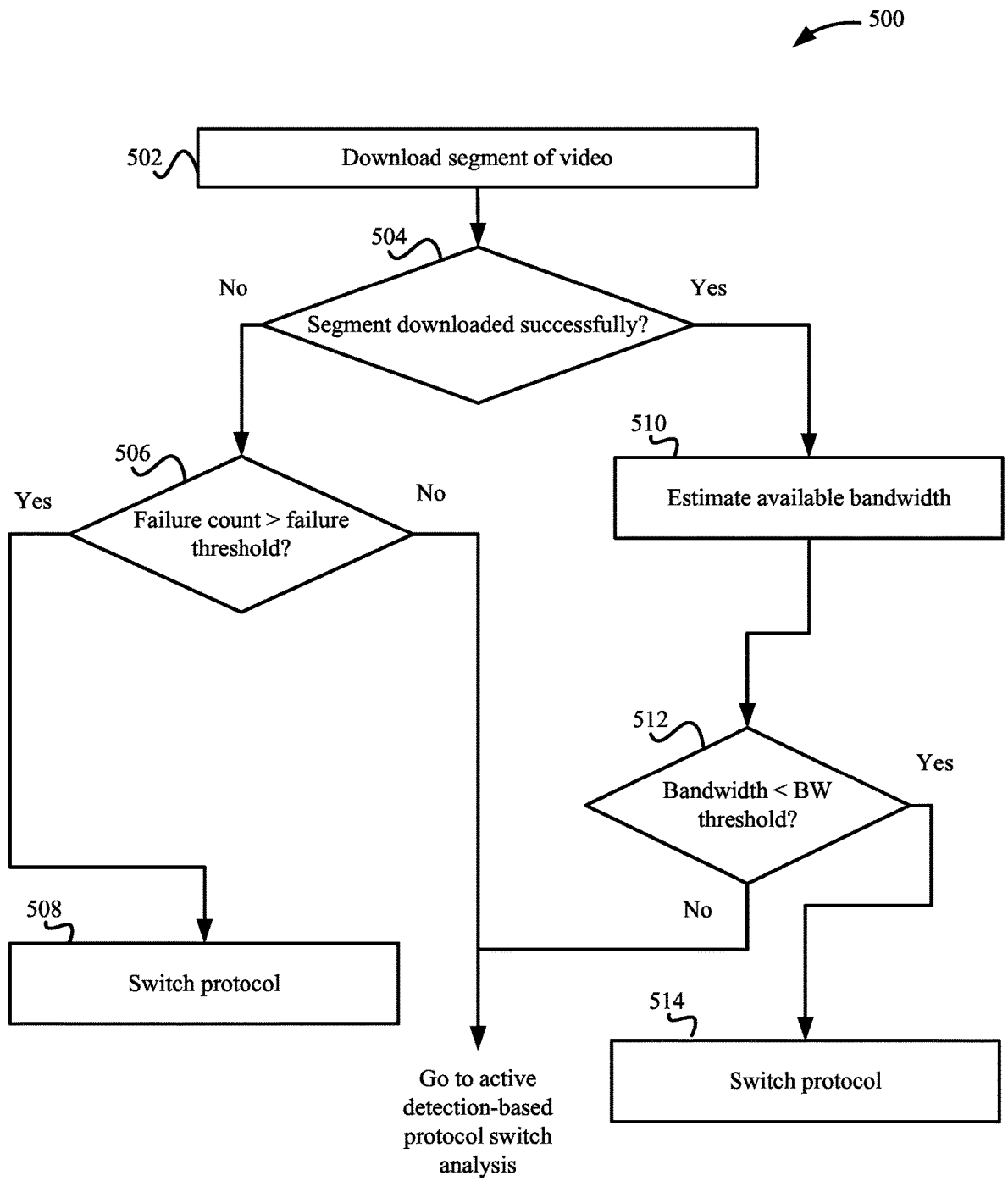
FIG. 5 depicts a simplified flowchart of a method for performing a passive triggered-based protocol switch according to some embodiments.

FIG. 5 depicts a simplified flowchart 500 of a method for performing a passive triggered-based protocol switch according to some embodiments. At 502, client device 104 downloads a segment of video. Then, at 504, in-session protocol adapter 110 determines if the segment is downloaded successfully. A successful download may mean that the entire segment is downloaded completely, but other conditions may apply. Also, the playback of the segment without rebuffering may be required. A time limit may also be applied to determine if the segment is downloaded successfully within a certain time.

If the segment is not downloaded successfully, in-session protocol adapter 110 analyzes a failure history. For example, at 506, in-session protocol adapter 110 determines if a failure count meets a failure threshold (e.g., the failure count is greater than the failure threshold). A failure count may be a count of the number of failures that have resulted for downloading of segments during the current playback session. For instance, three segments may have failed to download. If the failure count is greater than the failure threshold, then at 508, in-session protocol adapter 110 may switch protocols.

If the segment was downloaded successfully, then at 510, in-session protocol adapter 110 estimates the available bandwidth. For example, client device 104 may analyze the available bandwidth from the segments that are downloaded. The available bandwidth may be based on the amount of data downloaded over a time period during the current playback session.

In-session protocol adapter 110 analyzes the available bandwidth to determine whether to switch protocols. For example, at 512, in-session protocol adapter 110 determines if bandwidth meets a bandwidth (BW) threshold, such as the bandwidth is less than the bandwidth threshold. If the available bandwidth is less than the bandwidth threshold, then this may indicate that the network bandwidth is deteriorating. In this case, the protocol being used may not support the available bandwidth. For example, if the available bandwidth is less than the bitrate of the lowest profile of the protocol being used, then another protocol may operate better on the network. Accordingly, at 514, in-session protocol adapter 110 may switch protocols. The protocol that is selected may be a protocol that may have characteristics that may be better suited for the network conditions being experienced and available bandwidth may increase.

If the bandwidth is greater than the bandwidth threshold or the failure count is less than a failure threshold, then in-session protocol adapter 110 may perform the active detection-based switch analysis. For the active detection-based protocol switch, in-session protocol adapter 110 determines whether another protocol may perform better than the current protocol based on performance characteristics. For example, in-session protocol adapter 110 may consider whether the capability of the current protocol has been maximized. That is, in-session protocol adapter 110 may not switch protocols because the current protocol is operating at the highest possible performance level. If client device 104 is using the profile with the highest bitrate that is available for the protocol, then in-session protocol adapter 110 does not switch protocols.

In-session protocol adapter 110 may also use the buffer length to determine whether to switch protocols. The buffer length determines whether a media player can support the switch to another protocol. For example, switching to another protocol may require time to switch to the new protocol, which will require some data in the buffer to be used during the switch. If not enough data in the buffer is present, then the media player may experience rebuffering because the media player does not have enough data to play back the video. When the buffer length is long enough, then in-session protocol adapter 110 may attempt to switch protocols. Then, in-session protocol adapter 110 may switch back to the previous protocol if the new protocol is not better. Even if the performance of the new protocol is worse than the previous protocol, the playback may not be really affected because the buffer length is adequate to support the playback.

Figure 6:
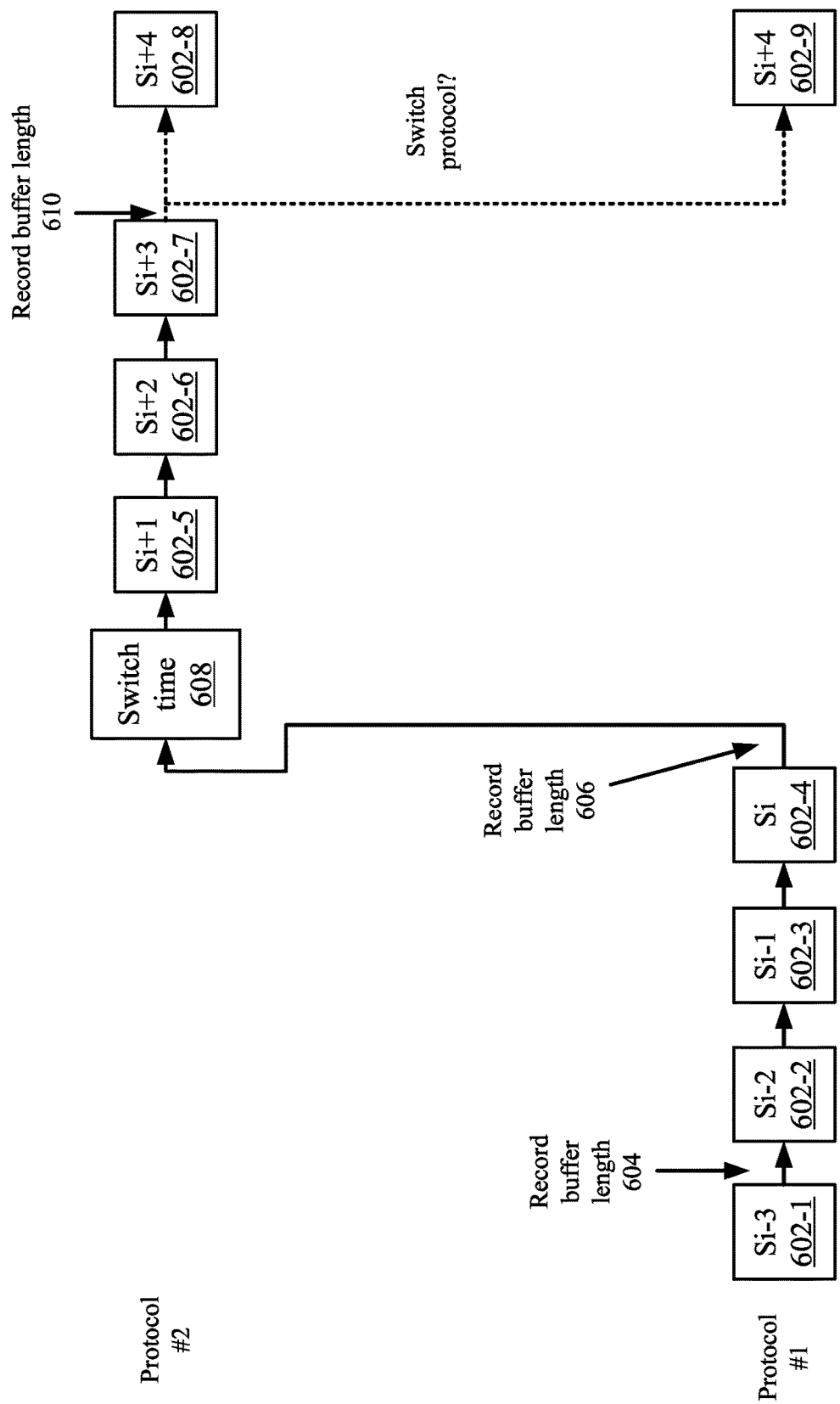
FIG. 6 depicts an example of an active detection-based protocol switch according to some embodiments.

FIG. 6 depicts an example of the active detection-based protocol switch according to some embodiments. A protocol #1 and a protocol #2 are shown. Protocol #1 may be the current protocol and protocol #2 may be the new protocol. Client device 104 may be downloading segments S of the video. For example, before the protocol switch, client device 104 downloads segment Si-3 602-1, segment Si-2 602-2, segment Si-1 602-3, and segment Si 602-4. The value of "i" may represent the time in which the protocol switch occurs.

In-session protocol adapter 110 may evaluate the performance of protocols using different metrics. For example, in-session protocol adapter 110 may use the buffer length to determine whether the new protocol is performing better. In-session protocol adapter 110 may use other metrics, such as bytes downloaded over time, etc. In-session protocol adapter 110 may determine the buffer length at different periods. For example, in-session protocol adapter 110 may record the initial buffer length at 604, which is a number of segments before the protocol switch. Three segments before the protocol switch may be used, but any number of segments before the protocol switch may be used. Also, in-session protocol adapter 110 records the buffer length at 606 when the protocol switch is made.

After the protocol switch occurs, a switch time 608 may be experienced by client device 104. Switch time 608 may be the time taken to build up a connection to receive segments via protocol #2. This may involve different processes, such as opening a new connection with a server, negotiating the parameters of the connection, and so on. If client device 104 has already opened a connection prior the switch, then switch time 608 may not be incurred. In some embodiments, client device 104 may tear down the session in which protocol #1 is being used to send video. In other embodiments, client device 104 may leave the connection open that is being used to send video via protocol #1.

After switch time 608, client device 104 receives packets using protocol #2, such as segment Si+1 602-5, segment Si+2 602-6, and segment Si+3 602-7. After receiving segment Si+3 602-7, in-session protocol adapter 110 records the buffer length at 610. For example, in-session protocol adapter 110 records the buffer length after the same number of segments have been received compared to the number of segments that were recorded before the protocol switch. Then, in-session protocol adapter 110 may use the buffer lengths to determine which protocol is performing better. For example, if the buffer length increases after the new protocol is used, then the new protocol may be better than the old protocol. This is because the video segments may be received faster due to better performance. However, if the buffer length decreases after the protocol switch, then the previous protocol may be better. This is because the video segments may be received slower due to worse performance.

After analyzing the buffer length, in-session protocol adapter 110 may make the decision whether to switch protocols. For example, in-session protocol adapter 110 may make the switch to protocol #2 permanent and download segment Si+4 602-8 using protocol #2. However, in-session protocol adapter 110 may determine that protocol #1 performs better and switches back to protocol #1 to download segment Si+4 602-9 using protocol #1. In some embodiments, in-session protocol adapter 110 may switch protocols from protocol #1 to protocol #2, and then back to protocol #1. If client device 104 has left the session open that was downloading segments using protocol #1, then time to switch back to protocol #1 may not be incurred. Rather, client device 104 can use the open session to request a segment and download the segment using protocol #1. However, if some switch time is required to switch back from protocol #2 to protocol #1, in-session protocol adapter 110 may take into account the switch time when deciding whether to switch back to protocol #1. For example, if the time to switch back to protocol #1 may possibly cause rebuffering and the performance of protocol #2 is not much different, then in-session protocol adapter 110 may continue with protocol #2. Although switching protocols is described where segments are received and played back using a different protocol, other methods may be used. For example, client device 104 may open multiple connections and download segments for the second protocol using a second connection in parallel with downloading segments for the first protocol. Client device 104 may play back the video using either segments. Accordingly, different methods that can evaluate the performance of multiple protocols can be used.

Figure 7:
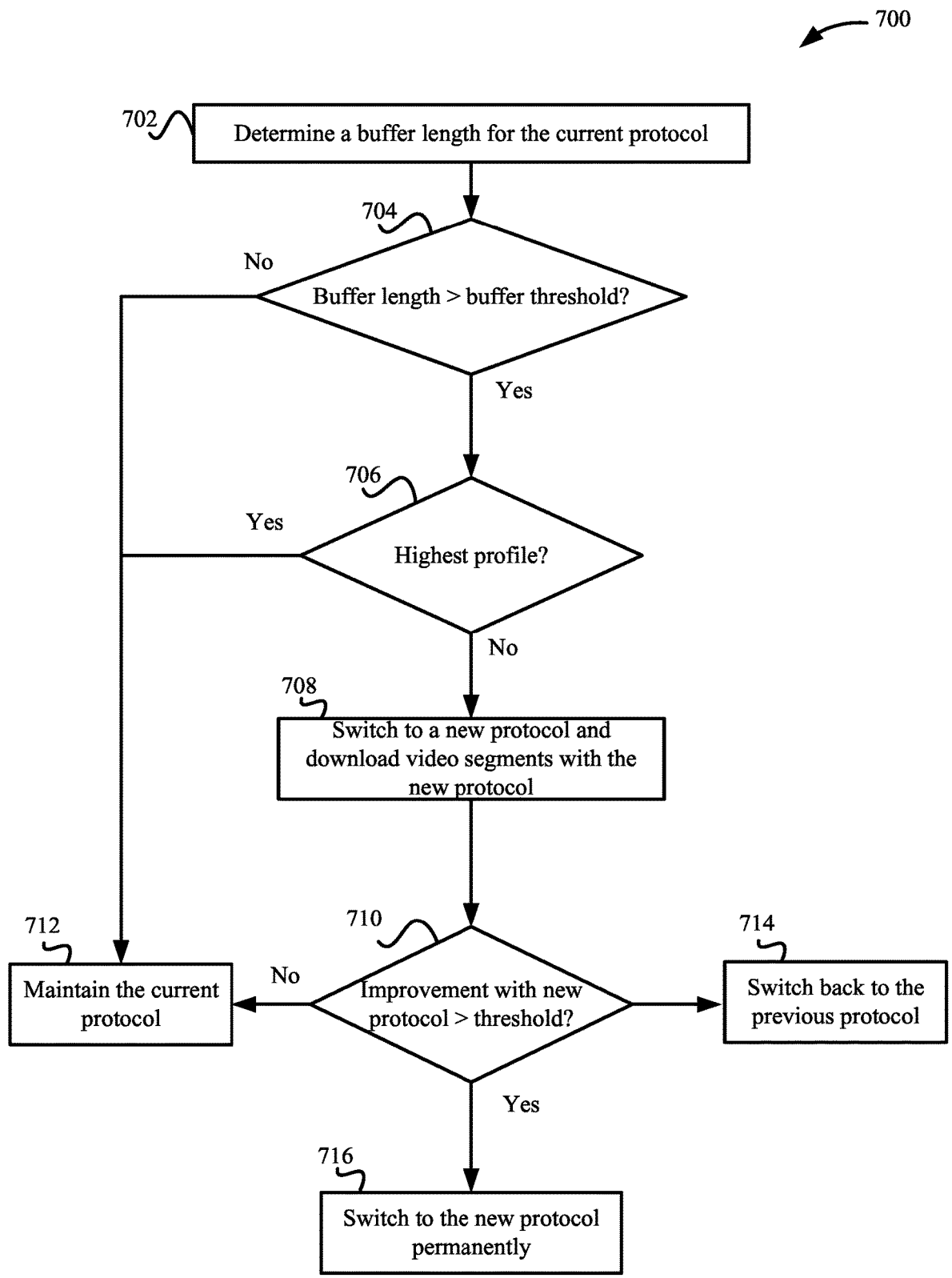
FIG. 7 depicts a simplified flowchart of a method for performing the active detection-based protocol switch analysis according to some embodiments.

FIG. 7 depicts a simplified flowchart 700 of a method for performing the active detection-based protocol switch analysis according to some embodiments. At 702, in-session protocol adapter 110 determines a buffer length for the current protocol. At 704, in-session protocol adapter 110 determines if the buffer length meets a buffer threshold, such as whether the buffer length is greater than the buffer threshold. If the buffer length is not greater than the buffer threshold, then at 712, in-session protocol adapter 110 may maintain the current protocol. The current protocol is maintained because there may not be enough data in the buffer to support playback without causing a problem, such as rebuffering.

If the buffer length is greater than the buffer threshold, at 706, in-session protocol adapter 110 determines if a highest profile is being used. If the highest profile is being used, then at 712, in-session protocol adapter 110 maintains the current protocol. In-session protocol adapter 110 maintains the current protocol because the highest profile is being used, which has the highest bitrate. Therefore, a switch to another protocol is not needed since this protocol is performing optimally. If the highest protocol is not being used, at 708, in-session protocol adapter 110 switches to a new protocol and downloads video segments with the new protocol.

At 710, in-session protocol adapter 110 determines if an improvement with the new protocol meets a threshold. The improvement may be measured by a performance characteristic, such as buffer length, number of bytes downloaded, or available bandwidth. If the improvement does not meet a threshold, at 714, in-session protocol adapter 110 may switch back to the previous protocol that was being used before switching to the new protocol. However, at 716, if the improvement is greater than the threshold, in-session protocol adapter 110 may make the switch to the new protocol permanent. When making the switch permanent is discussed, this means the switch may be permanent until the next analysis is performed to determine if the protocol should be switched. That is, the new protocol is now the current protocol until the next analysis is performed.

In some embodiments, to determine the improvement that is gained by switching protocols, in-session protocol adapter 110 may measure the improvement using different methods. As discussed above, a metric may use the buffer length to determine the improvement. In some embodiments, the following metric may be used to estimate the improvement of the new protocol:

$$\text{gain}_{switch} = (\text{buffer}_{i+3} - \text{buffer}_i) - (\text{buffer}_i - \text{buffer}_{i-3}).$$

In the above, the first portion of the equation ($\text{buffer}_{i+3} - \text{buffer}_i$) is the buffer length after the protocol switch and the second portion ($\text{buffer}_i - \text{buffer}_{i-3}$) is the buffer length before the protocol switch. The first portion represents the change in buffer length after downloading three segments using the new protocol and the second portion represents the buffer length change based on downloading three segments before switching the protocol. The gain metric may consider the download capability before the protocol switch and after the protocol switch. To take into account some overhead to perform the switch, the first portion may also include switch time 408, and the second portion may include some time to switch back to the previous protocol. If the improvement is greater than a threshold, then in-session protocol adapter 110 may consider the new protocol better than the previous protocol. Otherwise, in-session protocol adapter 110 may switch back to the previous protocol.

Conclusion

Accordingly, some embodiments dynamically predict a protocol to use before a playback session starts. The protocol that is used may be considered optimal for the playback session. Also, during the session, if conditions change or are different from the conditions that were used to predict the protocol, an in-session protocol adapter 110 may switch protocols to another protocol. The above dynamic selection of protocols may improve the playback performance by selecting a protocol that may be optimal for the current playback session.

Example Embodiments

In some embodiments, a method comprising: sending, by a computing device, a set of requests for a video, wherein a first protocol is used from a plurality of protocols that are available for use in a playback session for the video; comparing, by the computing device, a first performance of the first protocol and a second performance of a second protocol; and determining, by the computing device, whether to switch from using the first protocol to the second protocol in the playback session based on the comparing.

In some embodiments, the method further comprising: when the switch is made to the second protocol, sending a request for a segment of the video, wherein the second protocol is requested; and when the switch is not made to the second protocol, sending the request for the segment of the video, wherein the second protocol is not requested and the segment of video is received using the first protocol.

In some embodiments, the first protocol is selected from the plurality of protocols based on characteristics of the playback session before playback of the video starts.

In some embodiments, the first protocol is selected from the plurality of protocols based on characteristics of a client device that sent a request for the video.

In some embodiments, the method further comprising: prior to sending the set of requests, opening the playback session using the first protocol.

In some embodiments, comparing the first performance of the first protocol and the second performance of the second protocol comprises: calculating a first performance metric for the first protocol using a first set of segments that are received using the first protocol; and calculating a second performance metric for the second protocol using a second set of segments that are received using the second protocol.

In some embodiments, comparing the first performance of the first protocol and the second performance of the second protocol comprises: switching from the first protocol to the second protocol after receiving the first set of segments, wherein the second performance metric is calculated after the switching.

In some embodiments, determining whether to switch from using the first protocol to the second protocol in the playback session comprises: comparing the first performance metric to the second performance metric; and switching to the second protocol when a difference between the second performance metric and the first performance metric meets a threshold.

In some embodiments, the method further comprising: switching back to the first protocol when the difference does not meet the threshold.

In some embodiments, the method further comprising: before performing the comparing and the determining whether to switch: determining whether a buffer length meets a threshold; and waiting to perform the comparing and the determining whether to switch until the buffer length meets the threshold.

In some embodiments, the method further comprising: before performing the comparing and the determining whether to switch: determining whether a profile in a profile ladder is a highest profile, wherein profiles in the profile ladder are associated with different playback characteristics of the video; and waiting to perform the comparing and the determining whether to switch until the profile being used to request the video is not the highest profile.

In some embodiments, comparing the first performance of the first protocol and the second performance of the second protocol comprises: determining whether a segment of video is downloaded successfully; if the segment is not downloaded successfully, determining whether a number of failures meets a threshold, wherein the number of failures is based on a number of segments that have not been downloaded successfully in the playback session; and when the number of failures meets a threshold, switching from the first protocol to the second protocol.

In some embodiments, comparing the first performance of the first protocol and the second performance of the second protocol comprises: determining an available bandwidth; determining whether the available bandwidth meets a threshold; and when the available bandwidth meets the threshold, switching from the first protocol to the second protocol.

In some embodiments, a non-transitory computer-readable storage medium containing instructions, that when executed, control a computer system to be operable for: sending a set of requests for a video, wherein a first protocol is used from a plurality of protocols that are available for use in a playback session for the video; comparing a first performance of the first protocol and a second performance of a second protocol; and determining whether to switch from using the first protocol to the second protocol in the playback session based on the comparing.

In some embodiments, a method comprising: receiving, by a computing device, a request for a video; calculating, by the computing device, a performance metric for a plurality of protocols, wherein the plurality of protocols are usable to send the video; comparing, by the computing device, the performance metric for the plurality of protocols to predict a protocol in the plurality of protocols to use during a playback session for the video; and outputting, by the computing device, information for the protocol as a setting for the playback session, wherein video for the playback session is sent using the protocol.

In some embodiments, calculating the performance metric for a plurality of protocols comprises: calculating a first performance metric for a first protocol; and calculating a second performance metric for a second protocol, wherein the first performance metric and the second performance metric are calculated using historical data from playback sessions associated with a client device that requested the video.

In some embodiments, calculating the performance metric for a plurality of protocols comprises: using a function that compensates for a first protocol being selected less than a second protocol in the calculating of the performance metric.

In some embodiments, comparing the performance metric for the plurality of protocols comprises: determining a difference between a first performance metric for a first protocol and a second performance metric for a second protocol; and when the difference meets a threshold, selecting one of the plurality of protocols with a highest performance metric.

In some embodiments, when the difference does not meet a threshold, randomly selecting the protocol from the plurality of protocols.

In some embodiments, the method the information for the protocol comprises a ranking of the plurality of protocols.

System

Figure 8:
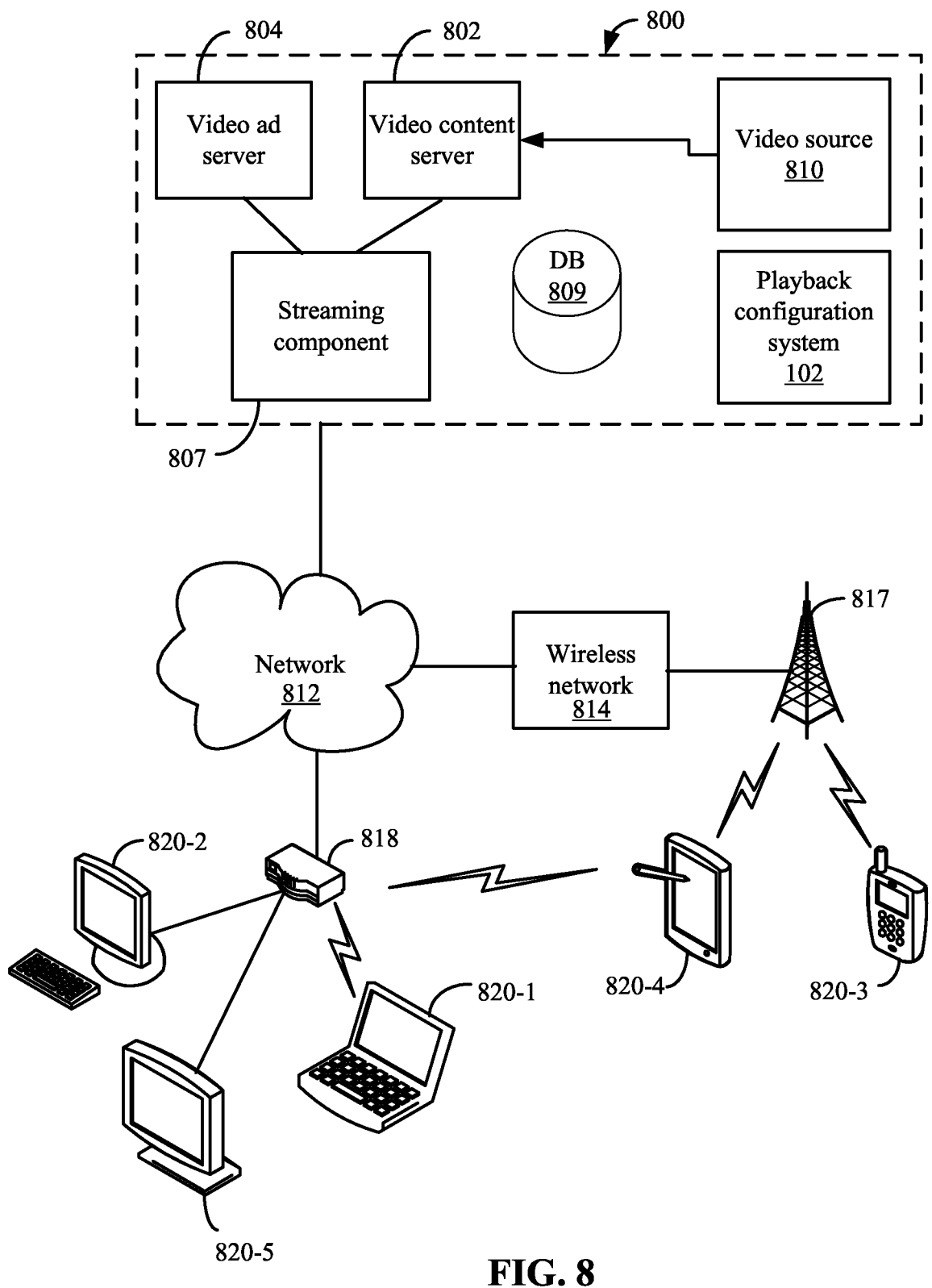
FIG. 8 depicts a video streaming system in communication with multiple client devices via one or more communication networks according to one embodiment.

Features and aspects as disclosed herein may be implemented in conjunction with a video streaming system 800 in communication with multiple client devices via one or more communication networks as shown in FIG. 8. Aspects of the video streaming system 800 are described merely to provide an example of an application for enabling distribution and delivery of content prepared according to the present disclosure. It should be appreciated that the present technology is not limited to streaming video applications and may be adapted for other applications and delivery mechanisms.

In one embodiment, a media program provider may include a library of media programs. For example, the media programs may be aggregated and provided through a site (e.g., website), application, or browser. A user can access the media program provider's site or application and request media programs. The user may be limited to requesting only media programs offered by the media program provider.

In system 800, video data may be obtained from one or more sources for example, from a video source 810, for use as input to a video content server 802. The input video data may comprise raw or edited frame-based video data in any suitable digital format, for example, Moving Pictures Experts Group (MPEG)-1, MPEG-2, MPEG-4, VC-1, H.264/Advanced Video Coding (AVC), High Efficiency Video Coding (HEVC), or other format. In an alternative, a video may be provided in a non-digital format and converted to digital format using a scanner and/or transcoder. The input video data may comprise video clips or programs of various types, for example, television episodes, motion pictures, and other content produced as primary content of interest to consumers. The video data may also include audio or only audio may be used.

The video streaming system 800 may include one or more computer servers or modules 802, 804, and/or 807 distributed over one or more computers. Each server 802, 804, 807 may include, or may be operatively coupled to, one or more data stores 809, for example databases, indexes, files, or other data structures. A video content server 802 may access a data store (not shown) of various video segments. The video content server 802 may serve the video segments as directed by a user interface controller communicating with a client device. As used herein, a video segment refers to a definite portion of frame-based video data, such as may be used in a streaming video session to view a television episode, motion picture, recorded live performance, or other video content.

In some embodiments, a video advertising server 804 may access a data store of relatively short videos (e.g., 10 second, 30 second, or 60 second video advertisements) configured as advertising for a particular advertiser or message. The advertising may be provided for an advertiser in exchange for payment of some kind or may comprise a promotional message for the system 800, a public service message, or some other information. The video advertising server 804 may serve the video advertising segments as directed by a user interface controller (not shown).

The video streaming system 800 also may include playback configuration system 102.

The video streaming system 800 may further include an integration and streaming component 807 that integrates video content and video advertising into a streaming video segment. For example, streaming component 807 may be a content server or streaming media server. A controller (not shown) may determine the selection or configuration of advertising in the streaming video based on any suitable algorithm or process. The video streaming system 800 may include other modules or units not depicted in FIG. 8, for example, administrative servers, commerce servers, network infrastructure, advertising selection engines, and so forth.

The video streaming system 800 may connect to a data communication network 812. A data communication network 812 may comprise a local area network (LAN), a wide area network (WAN), for example, the Internet, a telephone network, a wireless cellular telecommunications network (WCS) 814, or some combination of these or similar networks.

One or more client devices 820 may be in communication with the video streaming system 800, via the data communication network 812, wireless cellular telecommunications network 814, and/or another network. Such client devices may include, for example, one or more laptop computers 820-1, desktop computers 820-2, "smart" mobile phones 820-3, tablet devices 820-4, network-enabled televisions 820-5, or combinations thereof, via a router 818 for a LAN, via a base station 817 for a wireless cellular telecommunications network 814, or via some other connection. In operation, such client devices 820 may send and receive data or instructions to the system 800, in response to user input received from user input devices or other input. In response, the system 800 may serve video segments and metadata from the data store 809 responsive to selection of media programs to the client devices 820. Client devices 820 may output the video content from the streaming video segment in a media player using a display screen, projector, or other video output device, and receive user input for interacting with the video content.

Distribution of audio-video data may be implemented from streaming component 807 to remote client devices over computer networks, telecommunications networks, and combinations of such networks, using various methods, for example streaming. In streaming, a content server streams audio-video data continuously to a media player component operating at least partly on the client device, which may play the audio-video data concurrently with receiving the streaming data from the server. Although streaming is discussed, other methods of delivery may be used. The media player component may initiate play of the video data immediately after receiving an initial portion of the data from the content provider. Traditional streaming techniques use a single provider delivering a stream of data to a set of end users. High bandwidth and processing power may be required to deliver a single stream to a large audience, and the required bandwidth of the provider may increase as the number of end users increases.

Streaming media can be delivered on-demand or live. Streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities via a specialized device that accepts requests for video files, and with information about the format, bandwidth and structure of those files, delivers just the amount of data necessary to play the video, at the rate needed to play it. Streaming media servers may also account for the transmission bandwidth and capabilities of the media player on the destination client. Streaming component 807 may communicate with client device 820 using control messages and data messages to adjust to changing network conditions as the video is played. These control messages can include commands for enabling control functions such as fast forward, fast reverse, pausing, or seeking to a particular part of the file at the client.

Since streaming component 807 transmits video data only as needed and at the rate that is needed, precise control over the number of streams served can be maintained. The viewer will not be able to view high data rate videos over a lower data rate transmission medium. However, streaming media servers (1) provide users random access to the video file, (2) allow monitoring of who is viewing what video programs and how long they are watched (3) use transmission bandwidth more efficiently, since only the amount of data required to support the viewing experience is transmitted, and (4) the video file is not stored in the viewer's computer, but discarded by the media player, thus allowing more control over the content.

Streaming component 807 may use TCP-based protocols, such as HTTP and Real Time Messaging Protocol (RTMP). Streaming component 807 can also deliver live webcasts and can multicast, which allows more than one client to tune into a single stream, thus saving bandwidth. Streaming media players may not rely on buffering the whole video to provide random access to any point in the media program. Instead, this is accomplished using control messages transmitted from the media player to the streaming media server. Other protocols used for streaming are Hypertext Transfer Protocol (HTTP) live streaming (HLS) or Dynamic Adaptive Streaming over HTTP (DASH). The HLS and DASH protocols deliver video over HTTP via a playlist of small segments that are made available in a variety of bitrates typically from one or more content delivery networks (CDNs). This allows a media player to switch both bitrates and content sources on a segment-by-segment basis. The switching helps compensate for network bandwidth variances and infrastructure failures that may occur during playback of the video.

The delivery of video content by streaming may be accomplished under a variety of models. In one model, the user pays for the viewing of video programs, for example, paying a fee for access to the library of media programs or a portion of restricted media programs, or using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad slots" or "ad breaks." With streaming video, the media player may be configured so that the client device cannot play the video without also playing predetermined advertisements during the designated ad slots.

Figure 9:
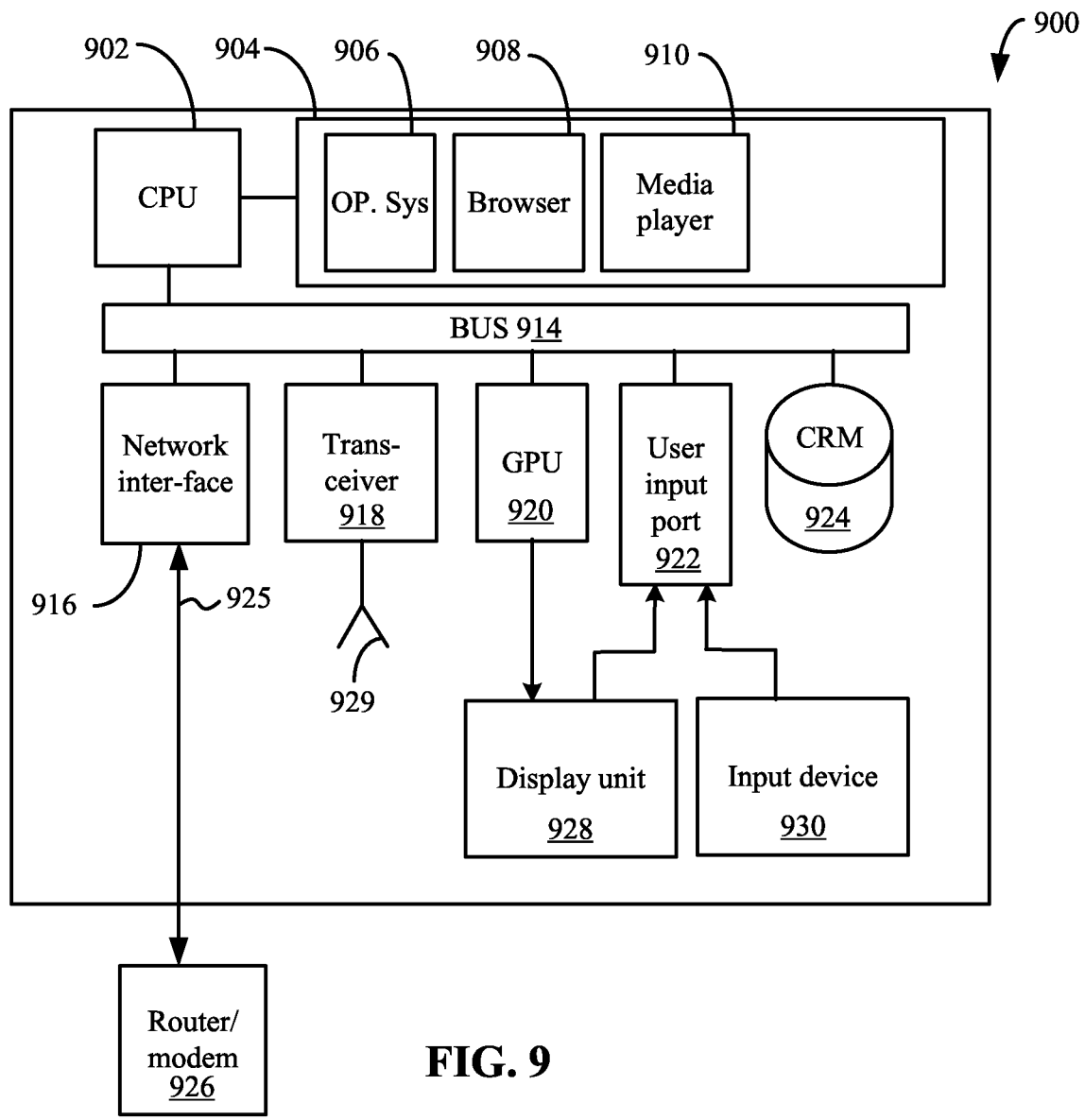
FIG. 9 depicts a diagrammatic view of an apparatus for viewing video content and advertisements.

Referring to FIG. 9, a diagrammatic view of an apparatus 900 for viewing video content and advertisements is illustrated. In selected embodiments, the apparatus 900 may include a processor (CPU) 902 operatively coupled to a processor memory 904, which holds binary-coded functional modules for execution by the processor 902. Such functional modules may include an operating system 906 for handling system functions such as input/output and memory access, a browser 908 to display web pages, and media player 910 for playing video. The modules may further include in-session protocol adapter 110. The memory 904 may hold additional modules not shown in FIG. 9, for example modules for performing other operations described elsewhere herein.

A bus 914 or other communication component may support communication of information within the apparatus 900. The processor 902 may be a specialized or dedicated microprocessor configured or operable to perform particular tasks in accordance with the features and aspects disclosed herein by executing machine-readable software code defining the particular tasks. Processor memory 904 (e.g., random access memory (RAM) or other dynamic storage device) may be connected to the bus 914 or directly to the processor 902, and store information and instructions to be executed by a processor 902. The memory 904 may also store temporary variables or other intermediate information during execution of such instructions.

A computer-readable medium in a storage device 924 may be connected to the bus 914 and store static information and instructions for the processor 902; for example, the storage device (CRM) 924 may store the modules 906, 908, 910 and 912 when the apparatus 900 is powered off, from which the modules may be loaded into the processor memory 904 when the apparatus 900 is powered up. The storage device 924 may include a non-transitory computer-readable storage medium holding information, instructions, or some combination thereof, for example instructions that when executed by the processor 902, cause the apparatus 900 to be configured or operable to perform one or more operations of a method as described herein.

A communication interface 916 may also be connected to the bus 914. The communication interface 916 may provide or support two-way data communication between the apparatus 900 and one or more external devices, e.g., the streaming system 800, optionally via a router/modem 926 and a wired or wireless connection. In the alternative, or in addition, the apparatus 900 may include a transceiver 918 connected to an antenna 929, through which the apparatus 900 may communicate wirelessly with a base station for a wireless communication system or with the router/modem 926. In the alternative, the apparatus 900 may communicate with a video streaming system 800 via a local area network, virtual private network, or other network. In another alternative, the apparatus 900 may be incorporated as a module or component of the system 800 and communicate with other components via the bus 914 or by some other modality.

The apparatus 900 may be connected (e.g., via the bus 914 and graphics processing unit 920) to a display unit 928. A display 928 may include any suitable configuration for displaying information to an operator of the apparatus 900. For example, a display 928 may include or utilize a liquid crystal display (LCD), touchscreen LCD (e.g., capacitive display), light emitting diode (LED) display, projector, or other display device to present information to a user of the apparatus 900 in a visual display.

One or more input devices 930 (e.g., an alphanumeric keyboard, microphone, keypad, remote controller, game controller, camera, or camera array) may be connected to the bus 914 via a user input port 922 to communicate information and commands to the apparatus 900. In selected embodiments, an input device 930 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit 928, for example using a touch sensitive screen. A cursor control device may communicate direction information and command selections to the processor 902 and control cursor movement on the display 928. A cursor control device may have two or more degrees of freedom, for example allowing the device to specify cursor positions in a plane or three-dimensional space.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured or operable to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments and are presented to illustrate the flexibility and advantages of some embodiments as defined by the following claims. Based on the above disclosure and the following claims, other arrangements, embodiments, implementations, and equivalents may be employed without departing from the scope hereof as defined by the claims.

What is claimed is:

1. A method comprising:
   sending a set of first requests for a set of first segments of a video in a playback session, wherein a first protocol from a plurality of protocols is specified in at least one of the set of first requests;
   receiving the set of first segments;
   determining whether to switch from using the first protocol to a second protocol in the playback session based on receiving the set of first segments; and
   when switching to the second protocol, sending a second request in the playback session, wherein the second request indicates the second protocol is to be used to send a second segment of the video.

2. The method of claim 1, further comprising:
   when the switch is not made to the second protocol, sending a third request for the second segment of the video and the second segment of video is received using the first protocol, wherein the second protocol is not requested in the third request.

3. The method of claim 1, wherein the first protocol is selected from the plurality of protocols based on characteristics of the playback session before playback of the video starts.

4. The method of claim 1, wherein the first protocol is selected from the plurality of protocols based on characteristics of a client device that sent a request for the video.

5. The method of claim 1, further comprising:
   prior to sending the set of first requests, opening the playback session using the first protocol.

6. The method of claim 1, further comprising:
   comparing a first performance of the first protocol and a second performance of the second protocol, wherein determining whether to switch from using the first protocol to the second protocol is based on the comparing.

7. The method of claim 6, further comprising:
   calculating a first performance metric for the first protocol using the set of first segments that are received using the first protocol; and
   calculating a second performance metric for the second protocol using a set of second segments that are received using the second protocol.

8. The method of claim 7, wherein comparing the first performance of the first protocol and the second performance of the second protocol comprises:
   switching from the first protocol to the second protocol after receiving the set of first segments, wherein the second performance metric is calculated after the switching.

9. The method of claim 7, wherein determining whether to switch from using the first protocol to the second protocol in the playback session comprises:
comparing the first performance metric to the second performance metric;
switching to the second protocol when a difference between the second performance metric and the first performance metric meets a threshold; and
switching back to the first protocol when the difference does not meet the threshold.

10. The method of claim 1, wherein determining whether to switch from using the first protocol to the second protocol in the playback session comprises:
determining whether a buffer length meets a threshold; and
waiting to perform the determining whether to switch until the buffer length meets the threshold.

11. The method of claim 1, wherein determining whether to switch from using the first protocol to the second protocol in the playback session comprises:
determining whether a profile in a profile ladder is a highest profile, wherein profiles in the profile ladder are associated with different playback characteristics of the video; and
waiting to perform the determining whether to switch until the profile being used to request the video is the highest profile.

12. The method of claim 1, wherein determining whether to switch from using the first protocol to the second protocol in the playback session comprises:
determining whether a segment of video is downloaded successfully;
if the segment is not downloaded successfully, determining whether a number of failures meets a threshold, wherein the number of failures is based on a number of segments that have not been downloaded successfully in the playback session; and
when the number of failures meets a threshold, determining a switch from the first protocol to the second protocol should be determined.

13. The method of claim 1, wherein determining whether to switch from using the first protocol to the second protocol in the playback session comprises:
determining an available bandwidth;
determining whether the available bandwidth meets a threshold; and
when the available bandwidth meets the threshold, determining a switch from the first protocol to the second protocol should be determined.

14. The method of claim 1, wherein:
the set of first requests for the set of first segments is for a first profile from a plurality of profiles,
profiles in the plurality of profiles are associated with a plurality of bitrate levels,
the first protocol defines a first specification of how the video is sent using the plurality of profiles, and
the second protocol defines a second specification of how the video is sent using the plurality of profiles.

15. The method of claim 14, further comprising:
when switching to a second profile, sending a third request in the playback session, wherein the third request indicates the second profile is to be used to send a third segment of the video.

16. A non-transitory computer-readable storage medium containing instructions, that when executed, control a computer system to be operable for:
sending a set of first requests for a set of first segments of a video in a playback session, wherein a first protocol from a plurality of protocols is specified in at least one of the set of first requests;
receiving the set of first segments;
determining whether to switch from using the first protocol to a second protocol in the playback session based on receiving the set of first segments; and
when switching to the second protocol, sending a second request in the playback session, wherein the second request indicates the second protocol is to be used to send a second segment of the video.

17. A method comprising:
receiving a set of first segments of a video in a playback session;
performing a first protocol switch analysis, wherein the first protocol switch analysis causes a switch from a first protocol to a second protocol when conditions using the first protocol to receive the set of first segments indicate the second protocol is predicted to perform better than the first protocol; and
performing a second protocol switch analysis, wherein the second protocol switch analysis switches to the second protocol to determine whether conditions using the second protocol to receive the set of first segments indicate the second protocol is predicted to perform better than the first protocol.

18. The method of claim 17, wherein performing the first protocol switch analysis comprises:
determining whether a segment of video is downloaded successfully;
if the segment is not downloaded successfully, determining whether a number of failures meets a threshold, wherein the number of failures is based on a number of segments that have not been downloaded successfully in the playback session; and
when the number of failures meets a threshold, determining a switch from the first protocol to the second protocol should be determined.

19. The method of claim 17, wherein performing the first protocol switch analysis comprises:
determining an available bandwidth;
determining whether the available bandwidth meets a threshold; and
when the available bandwidth meets the threshold, determining a switch from the first protocol to the second protocol should be determined.

20. The method of claim 17, wherein performing the second protocol switch analysis comprises:
determining whether a buffer length meets a threshold;
when the buffer length meets the threshold, determining whether a profile in a profile ladder is a highest profile, wherein profiles in the profile ladder are associated with different playback characteristics of the video; and
comparing a change when using the second protocol to a threshold;
switching back to the first protocol when the change does not meet the threshold; and
maintaining using the second protocol when the change meets the threshold.

* * * * *